United States Patent [19]

Costanza

[11] 4,390,401

[45] Jun. 28, 1983

[54] ACRYLATE OR METHACRYLATE ESTERS OF ALKYLENE OXIDE ADDUCTS OF ALKYL/ARYL PHENOLS AS WETTING AGENTS FOR ULTRAVIOLET CURABLE COATING COMPOSITIONS

[75] Inventor: John R. Costanza, North Plainfield, N.J.

[73] Assignees: Celanese Corporation, New York, N.Y.; Celanese Corporation, New York, N.Y.

[21] Appl. No.: 237,217

[22] Filed: Feb. 23, 1981

[51] Int. Cl.³ .................. C08F 2/50; C08F 216/16
[52] U.S. Cl. .................. 204/159.24; 526/313
[58] Field of Search .................. 526/313; 204/159.23, 204/159.24

[56] References Cited

U.S. PATENT DOCUMENTS

| | | | |
|---|---|---|---|
| 3,629,197 | 12/1971 | Stiehl | 526/218 |
| 3,717,689 | 2/1973 | Tanaka et al. | 526/313 |
| 3,932,321 | 1/1976 | Maki et al. | 526/313 |
| 4,127,711 | 11/1978 | Lore et al. | 526/245 |
| 4,144,283 | 3/1979 | Matsubara | 526/313 |
| 4,279,718 | 7/1981 | Schuster et al. | 204/159.23 |
| 4,323,591 | 4/1982 | Wendling et al. | 204/159.23 |

FOREIGN PATENT DOCUMENTS 7104313  2/1972  South Africa.

*Primary Examiner*—Paul Lieberman
*Assistant Examiner*—A. H. Koeckert
*Attorney, Agent, or Firm*—Depaoli & O'Brien; Depaoli & O'Brien

[57] ABSTRACT

The use of acrylate or methacrylate esters of polyalkylene oxide derivatives of alkyl/aryl phenols as wetting agents and adhesion promoters in ultraviolet curable systems is disclosed. These materials may be added to the ultraviolet system in a quantity between about 5 and 50 weight percent, based on the total weight of the ultraviolet curable composition.

5 Claims, No Drawings

ACRYLATE OR METHACRYLATE ESTERS OF ALKYLENE OXIDE ADDUCTS OF ALKYL/ARYL PHENOLS AS WETTING AGENTS FOR ULTRAVIOLET CURABLE COATING COMPOSITIONS

BACKGROUND OF INVENTION

This invention relates to ultraviolet curable coating compositions. More particularly this invention relates to ultraviolet curable coating compositions having improved wetting and adhesion properties.

Ultraviolet curable coating compositions have been prepared from many materials, for example, U.S. Pat. No. 3,759,807 discloses a number of these systems. However, most ultraviolet curable coating compositions have been deficient in wetting and adhesion properties for a number of reasons. Predominant among these reasons is the fact that low incident energy is used to cure these compositions. As a result, migration and adhesion properties are greatly reduced. In particular, many of the prior art ultraviolet curable systems have been deficient in their adhesion to various metallic substrates, including aluminum.

U.S. Pat. No. 3,933,935 discloses the preparation and use of polyethoxylated hydroxy acrylates in ultraviolet coatings. No disclosure is made of the fact that these materials may or may not be adhesion promoters, and none of the materials disclosed are based upon an alkyl phenol block group.

U.S. Pat. No. 3,982,942 likewise discloses the ultraviolet curing of certain compositions. However, the compositions disclosed there are polyacrylates of dihydric phenols such as bisphenol. In this case the mono-acrylate is formed.

Thus, it is an object of this invention to prepare ultraviolet curable coating compositions.

It is another object of this invention to prepare such compositions which exhibit improved adhesion and wetting properties.

It is another object of this invention to prepare novel monomers for use in ultraviolet curable coating compositions, which monomers promote better wetting of substrates and result in superior adhesion and pigment wetting properties.

These and other objectives are obtained by preparing the compositions of the instant invention.

SUMMARY OF INVENTION

Basically, this invention involves the discovery that ultraviolet curable coating compositions having improved adhesion and wetting properties may be obtained by modifying standard ultraviolet curable coating compositions with an acrylate or methacrylate ester of a polyalkylene oxide derivative of a mono-hydric alkyl/aryl phenol at levels between about 1 and about 25 weight percent, based upon the total weight of the ultraviolet curable system.

DESCRIPTION OF INVENTION

The alkyl/aryl phenol/alkylene oxide/acrylate or methacrylate of the instant invention may be represented by the general formula

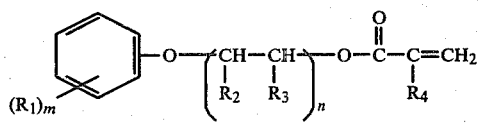

wherein $R_1$ is an alkyl group of 1-20 carbon atoms (preferably a hydrocarbon) or an aryl-containing group of 6-28 carbon atoms (preferably a hydrocarbon): m is a whole number integer of 1-3: $R_2$ and $R_3$ are alkyl or aryl groups or hydrogen, and are the same or different (one preferably being hydrogen), as are the various $R_1$ substituents: n is a whole number integer of from 1-36: and $R_4$ is hydrogen or methyl.

The above phenol acrylates are added to the ultraviolet curable compositions of the instant invention in a quantity between about 1 and 25 weight percent.

These alkyl/aryl phenol alkylene oxide acrylates or methacrylates may be prepared by known processes. For example, the alkyl/aryl phenol may be polyalkoxylated by reaction with ethylene oxide, propylene oxide, butylene oxide, styrene oxide, or any of the other monoepoxides to form a polyoxyalkylated phenol. Generally, this process involves reacting the phenol with the cyclic ether compound usually under acid catalysis.

The preferred oxyalkylating agents are ethylene oxide, propylene oxide, styrene oxide, butylene oxide, and the like. The preferred alkyl/aryl phenols are the alkyl phenols of known types utilized as the starting agent for the preparation of various non-ionic surfactants by technology well known in the art. Examples of these materials include alkyl phenols, such as nonyl phenol, and the various hydrocarbon alkyl phenols; aryl phenols, such as benzyl phenol; and the like.

Acrylation of the oxyalkylated phenol is accomplished by any one of several methods. For example, a transesterification reaction may be employed whereby, for example, methyl methacrylate or methyl acrylate are transesterified using an acid or ion exchange catalyst at temperatures ranging up to about 200° C. with removal of the transesterification product (e.g., methanol, in the case of methyl methacrylate) to form the acrylates or methacrylates of this invention.

In addition, acrylation or methacrylation may be carried out by a direct esterification method whereby acrylic acid or methacrylic acid is esterified with the oxyalkylated material by utilizing any of the various esterification catalysts, including ion exchange resins.

Generally, the acrylic or methacrylic acids are reacted with the ethoxyalkylated material in an aromatic solvent such as toluene or xylene using acid catalysts such as sulfuric acid, methane sulfonic acid, p-toluene sulfonic acid, phosphoric acid, polyphosphoric acid, boron trifluoride and its salts, and acid based minerals of ion-exchange resins. The ion-exchange catalysts are sulfonic acid derivatives of crosslinked polystyrene resins. Alternatively, the hydrochloric salts of amino or cationic ion-exchange resins may be employed.

Esterification is accompanied by removal of the water of reaction by standard distillation techniques. In the case of either transesterification or direct esterification, polymerization inhibitors may be employed to retard the formation of copolymer during the relatively high temperatures utilized during esterification or transesterification. Illustrative of polymerization inhibitors or nitrobenzene, phenothiazine, hydroquinone and its ethers, methylene blue, and the like.

The remaining curable portion of the ultraviolet compositions of the instant invention contain from about 20 to 98.0 weight percent, based upon the total curable composition, of an alpha beta ethylenically unsaturated vinyl polymerizable compound containing at least two vinyl polymerizable groups per molecule. Included are unsaturated esters of polyols and particularly such esters of the alpha ethylene carboxylic acids, e.g., ethylene glycol diacrylate, diethylene glycol diacrylate, glycerol diacrylate, glycerol triacrylate, ethylene glycol dimethacrylate, 1-3-propanediol dimethacrylate, 1,2,4-butanetriol trimethacrylate, 1,4-cyclohexandiol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacryatel, sorbitol hexacrylate, 1,3-propanediol diacrylate, 1,5-pentanediol dimethacrylate, 1,6-hexanediol diacrylate, the bis-acrylates and methacrylates of polyethylene glycols of a molecular weight of 200–1500, and the like; unsaturated amides, particularly those of the alpha ethylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-beta-hydroxyethyl-beta-(methacrylamido)ethyl acrylate, and N,N-bis(beta-methacryloxyethyl)acrylamide; vinyl esters such as divinyl succinate, divinyl adipate, divinyl phthalate, divinyl terephthalate, divinyl benzene-1,3-disulfonate, and divinyl benzene-1,4-disulfonate; styrene and derivatives thereof and unsaturated aldehydes, such as sorbaldehyde (hexadienal). A preferred class of these additional polymerizable components are esters and amides of alpha-ethylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, a polyurethane or a vinyl homo- or copolymer. Also included are polymers containing maleic and fumaric acids or esters, as well as polymeric unsaturated materials prepared by reacting vinyl hydroxy or carboxy materials with poly-epoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the mono-unsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxy- or ethoxyethyl acrylates, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These mono-unsaturated compounds may be added in amounts up to about 60 weight percent, based upon the total curable composition, preferably about 10 to about 30 percent.

The instant invention can also contain up to about 60 weight percent, based upon the total curable system of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene-1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.e., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

If desired, the instant systems can also contain immiscible polymeric or non-polymeric organic or inorganic fillers or reinforcing agents, e.g., the organophilic silicas, bentonites, silica, powdered glass, colloidal carbon, as well as various other types of dyes and pigments, in varying amounts. The fillers are useful in improving the strength, reducing tack and as coloring agents in the coatings of this invention. The photosensitizers or photoinitiators used in the instant invention fall into many classes and include compounds such as benzoin derivatives, as disclosed in German Pat. No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromo-acetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'benzylbenzophenone, 3-chloroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

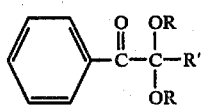

wherein R is alkyl of from 1-8 carbon atoms, or aryl with 6 carbon atoms, and R' is hydrogen, alkyl of from 1-8 carbon atoms, aryl of from 6-14 carbon atoms or cycloalkyl or 5-8 carbon atoms.

The alkylphenone photosensitizers having the formula

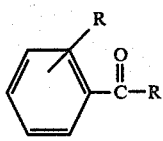

the benzophenone type photosensitizers having the formula

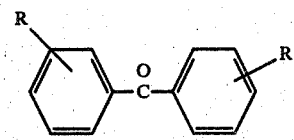

the tricyclic fused ring type having the formula

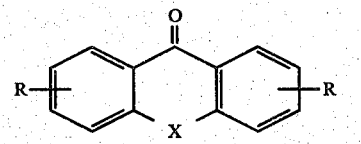

and the pyridyl type having the formula

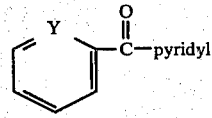

wherein the various substitutents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alpha-sulfonic acid, 3-chloro-2-methylanthraquinone, and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alpha-methyl benzoin, alpha-allyl benzoin, and alpha-phenyl benzoin. Also included are the diacylhalomethanes, corresponding to one of the general formulas:

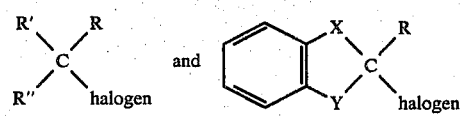

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G, Delzenne in *Industrie Cimique Belge*, 24 (1959), 739,764. Most preferred among the added initiators are benzoin and its alkyl ethers, benzophenone and its derivatives, as in Formula III, xanthone, thioxanthones, chlorinated thioxanthones, and acetophenone derivatives, as set out in Formula I, and halogenated, aliphatic and aromatic polychlorinated biphenyls and polyphenyls.

The photosensitizers can be added in an amount of about 0.5 to about 15 weight percent, based upon the total curable system, preferably about 0.1 to about 5 percent.

Although not required for every photoinitiator, certain organic amines can be added to the photosensitizers above-described to further enhance the cure rate of the compositions of the instant invention in amounts up to about 500 weight percent, of the photosensitizer, preferably up to about 50 weight percent. The amines can be primary, secondary, or tertiary, and are illustrated by amine compounds such as methylamine, dimethylamine, trimethylamine, diethylamine, triethylamine, propylamine, isopropylamine, diisopropylamine, trisopropylamine, butylamine, tributylamine, t-butylamine, 2-methylbutylamine, N-methyl-N-butylamine, methanolamine, ethanolamine, diethanolamine, triethanolamine, methyldiethanolamine, dimethylethanolamine, isopropanolamine, propanolamine, diisopropanolamine, triisopropanolamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylylamine, tribenzylamine, triphenethylamine, benzyldimethylamine, benzyldihexylamine, and the like.

The preferred organic amines are the tertiary amines, with the alkanol amines being most preferred. The specific preferred amines activators are triethanolamine, morpholine and methyldiethanolamine.

The compositions of the instant invention after being prepared in the ratios as set out above can be applied to the material to be coated by conventional spraying means, and may, if desired, be dried under ambient or oven conditions to provide coating films on the substrate. The substrate can be of any composition, e.g., wood, metal, paper, plastic, fabric, fiber, ceramic, concrete, plaster, glass, etc.

The compositions of the instant invention, including the phenol acrylates, show excellent utility in applications where the substrate is one to which ultraviolet coatings have traditionally adhered to only with difficulty. Thus the instant invention is particularly applicable to coating compositions which are applied to metal, plastic, glass, etc.

Typically, a mixture of the compositions described above in combination with the initiator and, where utilized, the amine activator, is prepared and the composition sprayed onto the desired substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the compositions and can range from about 0.1 seconds up to about 1 min./linear ft. Generally, the light radiation will have power of about 200 watts per linear inch.

The light radiation can be utraviolet light generated from low, medium and high pressure mercury lamps. This equipment is readily available and its use is well known to those skilled in the art of radiation chemistry.

In the following examples, all parts and percentages are by weight, unless otherwise indicated.

EXAMPLE I

A composition containing 50 grams of trimethylolpropane triacrylate, 36 grams of an acrylate ester of ethoxylated nonylphenol containing 6 ethylene oxide units, and 4 grams of benzoin isobutyl ether was prepared.

A 0.5 mil coating was cast on an aluminum panel, and it was cured under a 200 watt high pressure mercury vapor UV lamp for 0.5 seconds. The cured coating had excellent adhesion to the aluminum panel and good solvent resistance.

EXAMPLE II 27 grams of poly(methyl methacrylate) (M.W. 36,000) was dissolved in a solution containing 30 grams of 1,4-butanediol diacrylate, 20 grams of trimethylolpropane trimethacrylate, 15 grams of ethoxylated octylphenol containing 10 ethylene oxide units, 4 grams of benzophenone and 4.0 grams of diethanolamine.

A 0.6 mil coating was cast on an unprimed steel panel and it was cured under a 200 watt medium pressure mercury vapor UV lamp for 0.5 seconds. The cured coating adhered well to the unprimed steel.

EXAMPLE III

An ultraviolet-cured coating for vinyl tile was prepared by dissolving 20 grams of EPI-REZ 510 diacrylate (Celanese) into a solution containing 40 grams of hexanediol diacrylate, 10 grams poly(butyl acrylate) (M.W. 24,500), 25 grams of ethoxylated dodecyl phenol containing 10 ethylene oxide units, and 5 grams of benzoin isopropyl ether.

A 0.5 mil film was cast on vinyl tile and it was cured as in Examples I and II. The cured coating adhered well to the vinyl tile and provided a glossy finish.

EXAMPLE IV

A composition was prepared containing 25 grams of trimethylolpropane triacrylate, 20 grams of poly(ethyl acrylate) (M.W. 35,500), 20 grams of hexanediol diacrylate, 25 grams of an ethoxylated nonylphenol containing 4 ethylene oxide units, 5 grams of benzophenone, and 5 grams of triethanolamine.

A 1.0 mil coating was cast on an unfinished luan mahogany veneer panel, and it was cured 2.0 seconds in an ultraviolet apparatus in the manner of the previous Examples. The cured coating adhered well to the wood panel and formed a smooth shiny finish.

What is claimed is:

1. An improved ultraviolet curable coating composition containing a mixture of ultraviolet photoinitiator and polyunsaturated polyacrylates or methacrylates, and containing as an additional component between about 5 and 50 weight percent, based on the total ultraviolet composition, of a composition having the formula

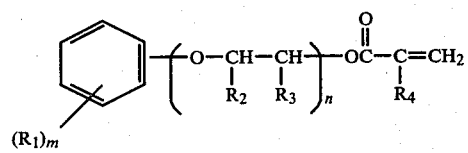

wherein $R_1$ is an alkyl group of 1–20 carbon atoms or an alkyl/aryl group of 6–28 carbon atoms; m is a whole number integer of 1–3; $R_2$ and $R_3$ are alkyl or aryl groups or hydrogen; n is a whole number integer of from 1–36; and $R_4$ is hydrogen or methyl.

2. The composition of claim 1 wherein $R_1$ is a nonyl group, m is 1, and $R_2$ and $R_3$ are hydrogen.

3. The composition of claim 1 wherein $R_2$ is H and $R_3$ is $CH_3$.

4. The composition of claim 1 wherein $R_2$ is $CH_3$ and $R_3$ is H.

5. The composition of claim 1 which contains trimethylolpropane triacrylate.

* * * * *